Nov. 26, 1935.  W. A. DOREY  2,022,078

LIGHT TRANSMITTING COVER FOR LIGHT SOURCES

Filed Oct. 4, 1932

INVENTOR.
William A. Dorey
BY
ATTORNEY.

Patented Nov. 26, 1935

2,022,078

UNITED STATES PATENT OFFICE 2,022,078

LIGHT TRANSMITTING COVER FOR LIGHT SOURCES

William A. Dorey, Newark, Ohio, assignor to Holophane Company, Inc., New York, N. Y., a corporation of Delaware Application October 4, 1932, Serial No. 636,156

4 Claims. (Cl. 240—106)

This invention relates to light transmitting covers for light sources. It is particularly valuable for rectilinear light sources and has for its object the transmission of more light than would be obtained with ordinary transmitting covers. The increase in light transmission is obtained by a special shape or contour of the cover.

When a light-source is placed back of a transmitting plate or cover glass, the light from the source which strikes the cover at right angles or at normal incidence, is efficiently transmitted. Only a very small part is reflected back toward the source. The light which strikes the plate at a small angle from the normal is also efficiently transmitted, only a small part being reflected. However, when the angle from the normal, known as the angle of incidence, is greater than a certain value, the amount of light reflected increases as the angle increases. With glass having the customary index of refraction, this angular value is about 45°. When the angle of incidence is greater than 45°, the amount of light reflected, even with a clear glass plate, causes a very appreciable loss. When the angle of incidence becomes very great, such as 80° to 85°, the amount of light reflected from the plate also becomes great and the amount of light transmitted correspondingly less.

With point light sources, transmitting cover glasses of concave cross section are often shaped around the light source to avoid high angles of incidence. With rectilinear light sources such curvature may be had in transverse planes only, for the transmitting cover must be of a length comparable with the length of the light source. Hence a large part of the light striking near the ends of the cover is incident at high angles. The transmission of such light tends to be inefficient.

The present invention contemplates the provision of a cover glass, of a contour adapted to decrease materially the average angle of incidence and hence the reflection losses, thereby increasing the transmission. This contour employs some form of hill and valley lengthwise of the glass.

The accompanying drawing shows, for purposes of illustrating the present invention, several embodiments in which the invention may take form, it being understood that the drawing is illustrative of the invention rather than limiting the same. In the drawing.

Figure 1:
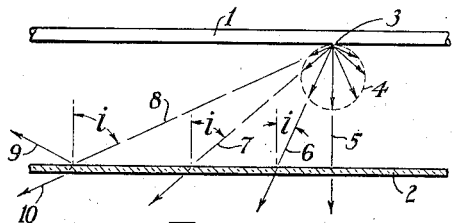
Fig. 1 shows a rectilinear light source placed above an ordinary flat cover glass, with an indication of the direction of light rays emitted from the source toward the cover, and in the plane of the sheet.

Fig. 1 shows a rectilinear light source 1 and below it a plate or cover glass 2. Every point on the rectilinear light source is emitting light in all directions. A typical point is shown at 3 and the light distribution obtained lengthwise of the plate is normally a circle illustrated at 4. Light ray 5 is normal to the transmitting cover and goes through with only a slight loss. Light ray 6 is at a slight angle with the transmitting cover. This angle between the normal to the cover and the light ray is known as the angle of incidence indicated by $i$. With light ray 7, the angle of incidence has increased and reached a value at which reflection from the interior surface is somewhat greater than with light rays 5 and 6. Light ray 8 strikes the cover glass at a high angle of incidence $i$ and is to a considerable degree reflected from the interior surface as indicated at 9. The portion transmitted, indicated at 10, is much less than with light rays 5, 6, and 7. While the intensity of light emitted from point 3 in direction 8 is much lower than the intensity in direction 5, it will be obvious that, considering all the points along the rectilinear source, a great deal of light strikes the plate at angles of incidence greater than that of ray 7 and hence the total loss due to reflection, such as illustrated by 8—9, is very considerable.

Figure 2:
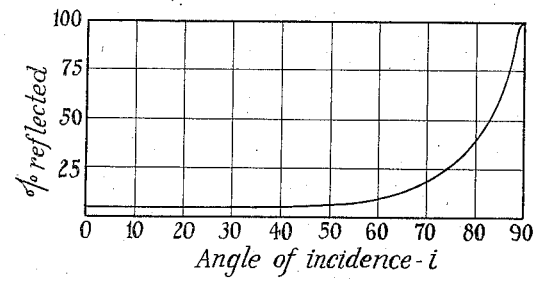
Fig. 2 shows the percent of light reflected at various angles of incidence with glass customarily used for light transmission.

Fig. 2 is a chart showing, at various angles of incidence, the actual percentage of light reflected at the incident surface by glass having an index of refraction of 1.50. The light transmitted into the glass then suffers a corresponding reflection from the outside surface of the glass so that the total reflected with a sheet of glass is considerably increased over that shown by the values in Fig. 2. It is obvious that at low angles of incidence, percentage of light reflected is small and hence the percentage of light transmitted is large. At an angle of about 45°, percentage of light reflected begins to increase. As the angle of incidence increases, the percent of light reflected increases more and more rapidly. At 80°, about 40% of the light is reflected from the inside surface, at 85°, over 60%. This indicates the high reflection losses which occur, even with a sheet of clear glass, when light strikes the glass at high angles of incidence. The percentage of light reflected varies with the index of refraction of the glass but this variation is of minor importance with respect to the matter considered here. With all glass or other material likely to be used for transmitting light in luminairs, the same general effect is obtained, the variations being only in the nature of a minor variation in the scale of Fig. 2.

Figure 3:
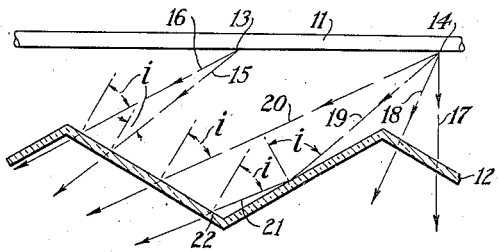
Fig. 3 illustrates a zig-zag cover glass adapted for increased light transmission.

Fig. 3 shows a rectilinear light source 11 and placed below it a zig-zag cover 12 in accordance with this invention. The cover may be made in one piece or may be built up of flat panes of crystal glass or other light transmitting material. Typical points of light emission from the rectilinear source are shown at 13 and 14. Typical light rays are illustrated and it will be clear from the figure that the general average angle of incidence is considerably lower than in Fig. 1. For example, light rays 15 and 16, respectively, correspond in angle from the source to light rays 7 and 8 of Fig. 1. However, the angles of incidence *i* with light rays 15 and 16 are obviously much smaller than with light rays 7 and 8. No matter where the point of light origin is located along the source, the advantages of lower angles of incidence are obtained. For example, point 14 is located at random on the rectilinear source. Light rays 17, 18, 19 and 20 from point 14, correspond in angle of emission from the source to light rays 5, 6, 7, and 8, respectively, of Fig. 1. Light ray 17 strikes the plate at a greater angle of incidence than light ray 5 of Fig. 1, but within the range wherein efficient light transmission is obtained. Light ray 18 strikes the plate at a lesser angle of incidence than light ray 6 of Fig. 1. Light rays typified by 19 strike the plate at far greater angles of incidence than corresponding light ray 7 of Fig. 1. It will be noted, however, that with this form of plate, a light ray such as 19 is to a very large measure reflected because of the high angle of incidence *i*, but this reflected light ray 21 strikes another section of the plate at 22 at an angle of incidence *i* favorable for light transmission. Proper design of the angular dimensions of the zig-zag plate insures this efficient action. Light ray 20, corresponding to light ray 8, obviously strikes the plate at a better angle of incidence *i* than obtained with ray 8.

Figure 4:
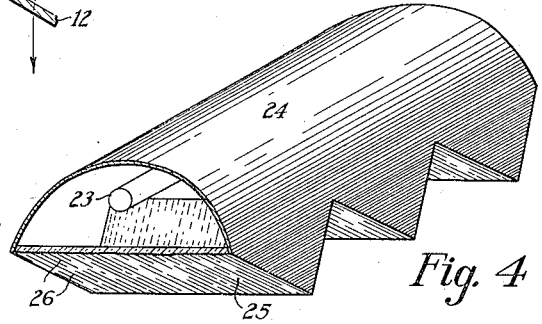
Fig. 4 shows a luminair using a tubular source, an opaque reflector, and a zig-zag cover glass.
Figure 5:
Figs. 5, 6, 7 and 8 show a few of the many possible variations in the contour of the glass embodying this invention.
Figure 6:
Figure 7:
Figure 8:
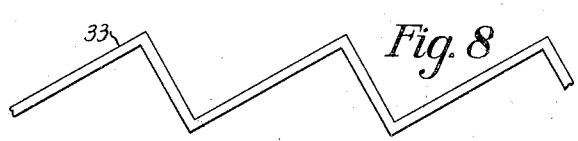

Fig. 4 is a perspective view of the bare essentials of a luminair. This illustrates a tubular light source 23, a reflector 24 over the light source, and a zig zag plate 25 placed under the light source for transmitting both direct and reflected light. The saw tooth construction is symmetrical and runs lengthwise of the light source in order to provide efficient transmission of light emitted at high angles lengthwise of the light source. In the figure, the end of the luminair is cut away to show more clearly the interior. Prisms or other forms in configuration may be placed on the zig-zag plate. Longitudinal prisms are illustrated at 26.

Figs. 5, 6, 7, and 8 show other possible contours of light transmitting covers for use below or in front of a rectilinear light-source. These indicate the shape of the cover in a direction lengthwise of the source. These forms may include the wave shape 30 of Fig. 5, the series of arches 31 of Fig. 6, the series of dished areas 32 of Fig. 7, or the nonsymmetrical sawtooth effect 33 of Fig. 8. Any one of these may have any desired form of prismatic or decorative configuration. Such configuration would be independent of the shape of the cover. When prisms are used, it is usually desirable to have the prisms run lengthwise of the light source, as indicated at 26 in Fig. 4. Such prisms do not interfere materially with the advantages of the zig-zag construction and they tend to afford best control of light from a rectilinear source.

While this hill and valley construction is described as consisting of smooth clear glass, it is not limited to such materials. The glass covers may be made of sand blasted, etched, or opal glass, or may have ornamental or prismatic configurations on their surfaces, or may consist of other light transmitting materials, and the serrated constructions will still give a marked improvement in output as compared with the same character of material in a smooth continuous sheet of similar material.

Many modifications are possible in this general idea. It is applicable to single rectilinear sources or a plurality of parallel rectilinear sources. It may be built into luminairs of various types. Rectilinear sources may be tubular, of filament form, or a succession of closely spaced, substantially point sources.

What is claimed is:

1. The combination with an elongated light source of a light intercepting and transmitting member occupying an area of substantial width and receiving light from said source at high angles of incidence to the plane of said area, said member comprising a succession of portions disposed lengthwise of the area, each portion extending across the area and comprising two parts inclined in opposite directions to the plane of said area so as to receive the light at lesser angles of incidence.

2. The combination set forth in claim 1, wherein each part of the light intercepting and transmitting member is provided with prisms in planes parallel with the source.

3. In combination, a rectilinear light source, a prismatic light transmitter arranged generally parallel with the light source, having prisms in planes parallel with the light source, and made up of a plurality of parts having a relatively small angle of obliquity to the general direction of the transmitter for reducing the angle of incidence of light received thereby so as to reduce the light lost by reflection therefrom and increase the light transmitted therethrough, the spread in lateral planes being controlled by the prisms, the angles of obliquity of said parts being alike but alternately of opposite sign to provide hills and valleys of the same slope.

4. In combination, a rectilinear light source, a prismatic light transmitter arranged generally parallel with the light source and having prisms in planes parallel with the light source, the transmitter comprising a plurality of portions with a relatively small angle of obliquity to the general direction of the transmitter, arranged alternately of opposite sign, the angle being such that a large part of the light incident on one portion at angles approaching the critical angle is reflected toward an adjacent portion which receives it at a lesser angle and transmits it, the spread in lateral planes being controlled by the prisms.

WILLIAM A. DOREY.